Patented Jan. 22, 1935

1,988,902

UNITED STATES PATENT OFFICE 1,988,902

PROCESS OF WORKING UP VULCANIZED RUBBER WASTE

Franz Keppeler, Berlin-Weissensee, Germany

No Drawing. Application March 17, 1934, Serial No. 716,171. In Germany January 24, 1933

4 Claims. (Cl. 18—47.5)

The invention relates to a process of working up or re-using vulcanized rubber waste.

It is already known to mix vulcanized rubber waste, after it has been reduced to pieces or ground, with an unvulcanizing rubber mixture. In working up vulcanized rubber waste which has not been ground into meal, sheets having a rough surface are obtained, and the subsequent treatment of such sheets requires a special press. If it is desired to manufacture sheets by employing vulcanized rubber waste, ground to meal by rollers, then it is only possible to produce very thin sheets. In order to produce sheets of thicker strength the Doublier-process known per se must be employed.

In the subsequent treatment of the plates in presses, a smooth surface which is undesirable for some purposes is usually obtained. This disadvantage can only be removed by expensive profiling of the pressing plates.

According to the invention, a new method of working up vulcanized rubber waste is disclosed by the fact that rubber waste reduced to coarse pieces is mixed with unvulcanized or primarily vulcanized rubber mixture, and that thereupon this mixture is subsequently worked up into sheets by the known patent rubber or cut sheet process, and if desired is vulcanized. In this way, it is possible to manufacture plates of any desired thickness, in which the surface does not exhibit any greatly projecting parts of vulcanized rubber, while it is also not too smooth. A primarily vulcanized rubber mixture is readily produced if strong precipitators are added to the rubber mixture. In such cases, a slight vulcanization, that is to say, a so-called primary vulcanization takes place already without the employment of heat.

In the process according to the invention, the special pressing is dispensed with, and there is also the possibility of preparing sheets of greater thicknesses, whereas when pressing is employed, there is a limit to the dimensions of the sheets.

A further particular advantage of the process according to the invention is that the vulcanized rubber waste, reduced to coarse pieces, can be worked up with primarily vulcanized rubber mixtures. In this way it is possible to work up vulcanized rubber waste simultaneously in an easy manner jointly with the primarily vulcanized rubber mixtures, which are frequently produced by the added vulcanization accelerators and thereby to form useful products. As employed in certain of the claims, the term plastic rubber is intended to include either unvulcanized rubber or such partially vulcanized rubber which can be satisfactorily milled or worked up with the vulcanized rubber waste to form the preliminary coherent sheets.

The sheets manufactured according to the invention and vulcanized may be employed for any desired purposes, for example for insulation, mats, stair-covers and the like.

By using coloured vulcanized rubber waste reduced to coarse pieces, marbled effects are also obtained, the usefulness of the rubber sheets thus patterned being thereby enhanced still further.

The process according to the invention may be carried out for example as follows:

Vulcanized rubber waste of different shades of colour is reduced to coarse pieces on a grinding machine as to form pieces of waste of about 2 to 10 millimetre length of side. These pieces of waste are thereupon combined in a mixing machine with unvulcanized or primarily vulcanized rubber mixture, non-uniform sheets being formed. These sheets are then combined into a cylindrical block in an ordinary masticator. The block is thereupon pressed in a steel cylinder and caused to freeze. After cooling, the block is removed from the steel cylinder, and a mandrel is forced through its axis, the said mandrel serving at the same time as shaft in a sheet cutting machine of construction known per se by means of which the block is turned. In the cutting machine, the block is pared off by a reciprocating knife in a constant thickness, which may be adjusted as desired thereby forming the required rubber sheets which have then still to be vulcanized.

I claim:

1. A process for the preparation of reclaimed rubber sheets having surfaces of a desirable intermediate degree of smoothness, which comprises in combination, the steps of reducing vulcanized rubber waste to coarse pieces of from 2-10 mm. in length, mixing said pieces with a batch of plastic rubber whereby a sheet of uneven thickness and surface configuration is formed, freezing said sheet into block form, paring sheets of said desirable thickness and surface from said block, and finally completely vulcanizing said last named sheets without alteration of the surface thus obtained.

2. A process for the preparation of reclaimed rubber sheets having surfaces of a desirable intermediate degree of smoothness, which comprises in combination, the steps of reducing vulcanized rubber waste to coarse pieces of from 2-10 mm. in length, mixing said pieces with a batch of primarily vulcanized rubber whereby a sheet of uneven thickness and surface configuration is formed, freezing said sheet into block form, paring sheets of said desirable thickness and surface from said block, and finally completely vulcanizing said last named sheets without alteration of the surface thus obtained.

3. A process for the preparation of reclaimed rubber sheets having surfaces of a desirable intermediate degree of smoothness, which comprises in combination, the steps of reducing vulcanized rubber waste to coarse pieces of from 2-10 mm. in length, mixing said pieces with a batch of unvulcanized rubber whereby a sheet of uneven thickness and surface configuration is formed, freezing said sheet into block form, paring sheets of said desirable thickness and surface from said block, and finally completely vulcanizing said last named sheets without alteration of the surface thus obtained.

4. A process for the preparation of reclaimed rubber sheets having surfaces of a desirable intermediate degree of smoothness, which comprises in combination, the steps of reducing vulcanized rubber waste to coarse pieces of from 2-10 mm. in length, forming sheets of irregular thickness and surface characteristics by mixing said pieces of waste with an unvulcanized rubber mixture, combining said sheets into a cylindrical block in a masticator, freezing the block, applying a mandrel to said block, paring sheets of said desirable thickness and surface condition from said block while rotating it, and submitting said finally prepared sheets to vulcanization, without alteration of said surface conditions.

FRANZ KEPPELER.